(12) United States Patent
Lee et al.

(10) Patent No.: US 10,479,867 B2
(45) Date of Patent: Nov. 19, 2019

(54) METHOD OF PRODUCING SUPER SOFT POLYACRYLATE-URETHANE (PAU) CORE-SHELL COPOLYMER DISPERSIONS BY SOLVENT FREE PROCESS

(71) Applicants: Da-Kong Lee, Taoyuan (TW);
Chin-Jen Jwo, Taoyuan (TW);
Wun-Syu Zeng, Taoyuan (TW)

(72) Inventors: Da-Kong Lee, Taoyuan (TW);
Chin-Jen Jwo, Taoyuan (TW);
Wun-Syu Zeng, Taoyuan (TW)

(73) Assignee: HO YU TEXTILE CO., LTD, Taoyuan (TW)

( * ) Notice: Subject to any disclaimer, the term of this patent is extended or adjusted under 35 U.S.C. 154(b) by 137 days.

(21) Appl. No.: 15/708,247

(22) Filed: Sep. 19, 2017

(65) Prior Publication Data
US 2019/0085135 A1   Mar. 21, 2019

(51) Int. Cl.
*C08G 81/02* (2006.01)
*C08G 18/73* (2006.01)
*C08G 18/75* (2006.01)
*C08G 18/34* (2006.01)
*C08G 18/10* (2006.01)
*C08G 18/08* (2006.01)
*C08G 18/48* (2006.01)
*C08G 18/66* (2006.01)
*C08G 18/72* (2006.01)
*C09D 175/04* (2006.01)
*C08G 18/42* (2006.01)

(52) U.S. Cl.
CPC ....... *C08G 81/024* (2013.01); *C08G 18/0866* (2013.01); *C08G 18/10* (2013.01); *C08G 18/348* (2013.01); *C08G 18/42* (2013.01); *C08G 18/48* (2013.01); *C08G 18/4854* (2013.01); *C08G 18/6625* (2013.01); *C08G 18/722* (2013.01); *C08G 18/73* (2013.01); *C08G 18/755* (2013.01); *C09D 175/04* (2013.01)

(58) Field of Classification Search
CPC .... C08G 81/024; C08G 18/755; C08G 18/10; C08G 18/0866; C08G 18/73; C08G 18/348

See application file for complete search history.

*Primary Examiner* — Catherine S Branch

(57) ABSTRACT

Method of producing super soft PAU core-shell copolymer dispersions is a solvent free process. The products have characteristics of both polyurethane and polyacrylate including being non-sticky, having a feeling of touching a peach when touching it by the hand, and having improved adhesion, tensile strength, and toughness.

9 Claims, 1 Drawing Sheet

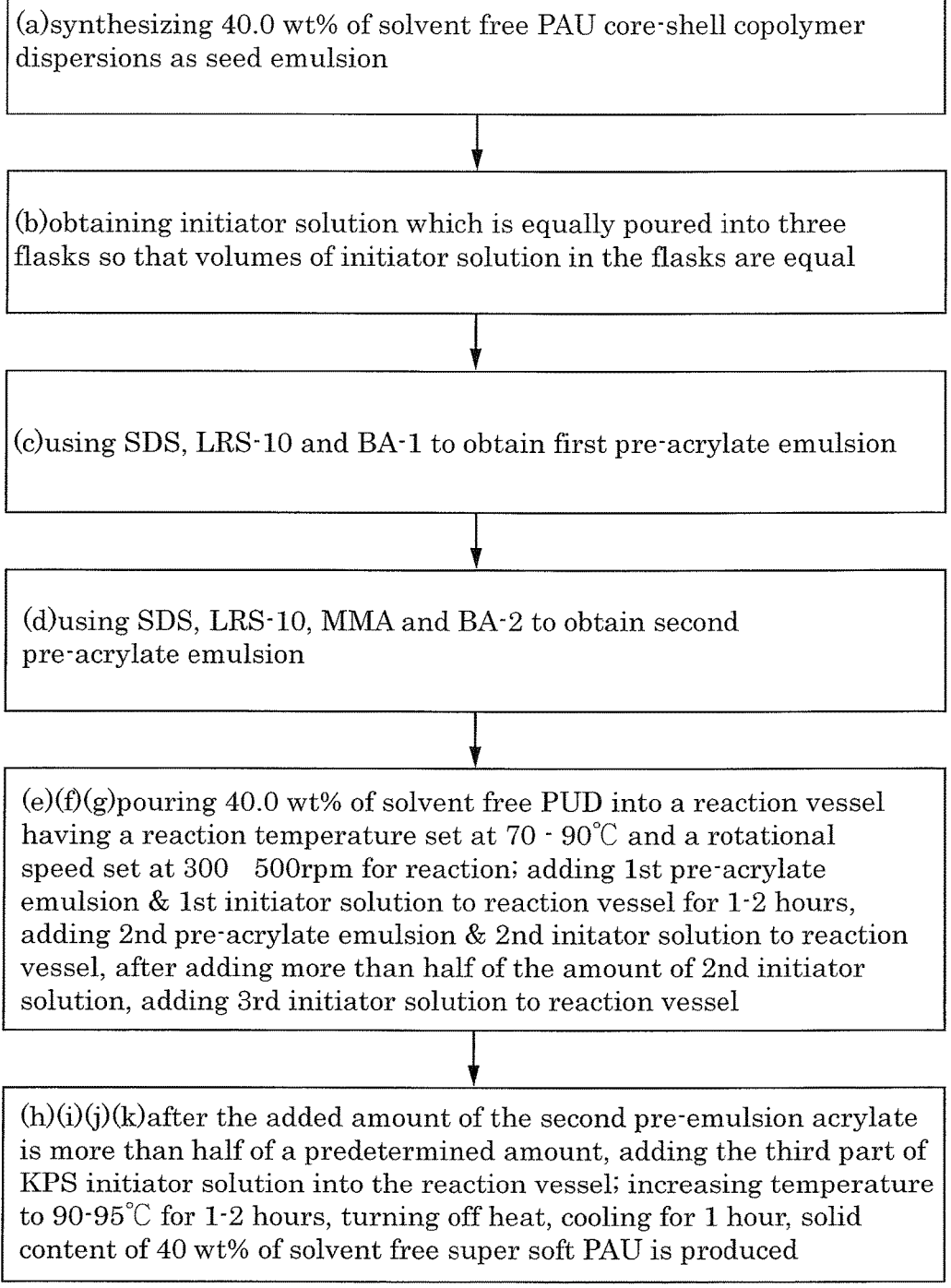

METHOD OF PRODUCING SUPER SOFT POLYACRYLATE-URETHANE (PAU) CORE-SHELL COPOLYMER DISPERSIONS BY SOLVENT FREE PROCESS

BACKGROUND OF THE INVENTION

1. Field of the Invention

The invention relates to methods of producing a polyacrylate-urethane (PAU) core-shell copolymer and, more particularly, to a method of producing super soft PAU core-shell copolymer dispersions by a solvent free process.

2. Description of Related Art

Regarding commercially available PAU core-shell copolymer dispersions, their prepolymers have a very high viscosity. Thus, 5 wt %-30 wt % of an organic solution is added in the process for decreasing viscosity. A large amount of volatile organic compounds (VOCs) is generated in the drying process. However, high VOCs may damage the environment, contribute to global warming and climate change, and are harmful to health.

In 2011 after the Detox movement held by a Greenpeace organization, Adidas, C&A, H&M, Li-Ning, Nike and PUMA have formed the zero discharge of hazardous chemicals (ZDHC) organization. ZDHC declare that at 2020 the raw materials and the manufacture process of footwear and textile industry should reach ZDHC standards with zero discharge of hazardous chemicals. Most polyurethane dispersions (PUDs) were produced by an acetone process there is a large amount of solvent involved, and some solvent residuals are left in the final products. The PUD products made by the acetone process will not reach the ZDHC standards.

For increasing softness, a softening agent, a plasticizer or the like is added to resin to improve the smoothness felt. However, these additives contain VOCs chemicals harmful to the environment. An easy technique is to increase the amount of the soft monomer content of the polyacrylate dispersion (PAD). However, such products are sticky and have a low tensile strength. Typically, the PAD is made by blending PAD and PUD. For PAU dispersions, when the added polyacrylate has more than 50 wt % of polyurethane (PU), layer separation and storage instability may occur. S. J. Son et al. chose PUD as the solution and added methyl methacrylate (MMA) to PUD. They found that the emulsion is not stable and that its particles may precipitate when the added MMA has more than 50 wt % of PUD. This is because PUD and PAD are immiscible and because chemical bonds are not formed in the mixing process.

Thus, the need for improvement still exists.

SUMMARY OF THE INVENTION

It is therefore one object of the invention to provide a method of producing super soft polyacrylate-urethane (PAU) core-shell copolymer dispersions by a solvent free process with copolymerization used to increase the amount of PAD in a PAU product. Thus, PAU properties are improved, and the manufacturing cost of PAU products greatly decreases.

For solving problems associated with the conventional PAU products, the invention provides a method of producing super soft polyacrylate-urethane (PAU) core-shell copolymer dispersions by a solvent free process comprising the steps of (a) synthesizing 40.0 wt % of solvent free PUD as a seed emulsion; (b) taking the initiator potassium persulfate (KPS) 0.20 wt %-0.60 wt % of the acrylate monomers to dissolve in deionized (D.I.) water to obtain an initiator solution which is equally distributed into three parts; (c) taking the emulsifier sodium dodecyl sulfonate (SDS) 0.20 wt %-0.30 wt % of the acrylate monomers, emulsifer polyoxyethylene alkyl ether amonium sulfonate (LRS10) 0.20 wt %-0.30 wt % of the acrylate monomers, and soft monomer n-butyl acrylate (n-BA) 3.0 wt %-8.0 wt % of the acrylate monomers to emulsify in deionized water to obtain a first pre-emulsion acrylate; (d) taking the emulsifer SDS 0.20 wt %-0.30 wt % of the acrylate monomers, the emulsifier LRS10 0.20 wt %-0.30 wt % of the acrylate monomers, the soft monomer n-BA 43.3 wt %-86.7 wt % of the acrylate monomers, and hard monomer methyl methacrylate (MMA) 8.0 wt %-52.0 wt % of the acrylate monoers to emulsify in the deionized water to obtain a second pre-emulsion acrylate; (e) pouring 40.0wt % of the solvent free PUD into a reaction vessel having a reaction temperature set at 70 -90° C. and a rotational speed set at 300 -500 rpm for reaction; (f) adding the first pre-emulsion acrylate and adding the first part of the KPS initiator solution dropwise to the reaction vessel for one to two hours; (g) adding the second pre-emulsion acrylate and the second part of the KPS initiator solution into the reaction vessel; (h) after the added amount of the second pre-emulsion acrylate is more than half of a predetermined amount, adding the third part of the KPS inititator solution into the reaction vessel; (i) increasing the reaction temperature up to 90 -95° C.; (i) maintaining the reaction temperature for one to two hours; and (k) turning off the heating and cooling the reaction vessel for one hour to produce a solid content of 40.0 wt % of solvent free super soft PAU core-shell copolymer dispersions, with a weight percentage ratio of polycrylate (PA) and PU is 25 wt %:100 wt %-100 wt %:100 wt %.

The invention has the following advantages:

(1) PUD and PAD can be copolymerized to produce solvent free super soft PAU core-shell copolymer dispersions. The anionomer is a 2,2-dimethylol butanoic acid (DMBA) and has a chemical structure similar to 2,2-dimethylol propionic acid (DMPA) with one extra methylene group. The melting point of DMBA is greatly decreased from 178° C.-180° C. for DMPA to 108° C.-115° C. for DMBA. DMBA has good miscibility with polyol and can be dissolved in polyol at a temperature as low as 70° C.- 80° C., but DMPA can only be dissolved at 180° C. Therefore, -cyanide ion (NCO) terminated prepolymer can be produced without using any solvent to melt the raw materials and can decrease the viscosity of the prepolymer. No distillation devices are required. The capital investment is greatly decreased. Energy consumption are greatly decreased. Compacity is greatly increased. No toxic volatile organic compounds is released. The PAU core-shell copolymer dispersions produced by this novel solvent free process can reach the ZDHC (zero discharge of hazardous chemicals) standards of the ZDHC organization, and they are environmentally friendly products.

(2) The amount of PA added in the PAU copolymer dispersions can be greater than 50 wt %. The core-shell structure can be clearly observed by a transmission electron microscope. Hence, reliable storage stability and improved properties are obtained. Also, the production cost is greatly decreased. A functional acrylate monomer is chosen as a coupling agent of PUD and PAD for forming the PAU copolymerized emulsion. The dispersion has stable properties even when the amount of added PAD is 100 wt %. The amount of PAD in the PAU products can be increased by copolymerization. Thus, properties of the PAU products can be improved. The manufacturing cost of the PAU products can be greatly decreased. The coupling agent created chemical bonds for PUD and PAD exhibits improved adhesion of nylon and polyester. Further, the improved adhesion of textile materials is verified by 120 times dry scrub test, and it displays a good adhesive property.

(3) The solvent free super soft PAU core-shell copolymer dispersions have a shell structure of PUD and a core structure of PAD, having the advantages of both PUD and PAD. Further, it has the soft touching feeling of polyacrylate and the flexible, tough properties of polyurethane. Hence, the PAU coated product may feel a degree of smoothness and comfort. The PAU products have good mechanical properties. The PAU products are free of a softening agent or plasticizer. The PAU coated fabric displays smoothness and no stickness. The PAU product has a 500% modulus less than 6.0 MPa, and a tensile strength greater than 15.0 MPa. The PAU coated fabric can feel like touching a peach, and can have a good mechanical property and toughness. Adhesion of the PAU product is improved. A person may feel a degree of comfort when touching a fabric made by the invention. Further, the fabric can withstand rubbing many times.

The above and other objects, features and advantages of the invention will become apparent from the following detailed description taken with the accompanying drawings.

BRIEF DESCRIPTION OF THE DRAWINGS

FIG. 1 is a flowchart of a method of producing super soft polyacrylate-urethane (PAU) core-shell copolymer dispersions by a solvent free process according to the invention.

DETAILED DESCRIPTION OF THE INVENTION

Referring to FIG. 1, a flowchart of a method of producing super soft PAU core-shell copolymer dispersions by a solvent free process according to the invention is illustrated by 12 preferred embodiments.

Embodiments 1-3 discuss the effect of a coupling agent hydroxyethyl acrylate (HEA) content in solvent free PAU dispersions in which a chain extension agent in PUD has a composition ratio of HEA: ethylene diamine (EDA) being one of 2:8, 0:10, and 4:6 for producing solvent free super soft PAU dispersion products.

Embodiment 1

A composition ratio of HEA:EDA as PUD chain extension agents is 2:8, and the synthesized PAU copolymer is called AUH2M2.

1. Synthesizing PUD Seed Emulsion:

(a) 210 -230 g (0.105 -0.115 mol) of polytetramethylene ethrer glycol (PTMEG) 2000 with a molar mass of 2000 g/mol is dried at 120° C. in vacuum for about two hours.

(b) the dried PTMEG 2000 is mixed with 15.0 -17.0 g (0.101 -0.115 mol) of DMBA at a reaction vessel at 70 -90° C. at a rotational speed of 100 rpm for about one hour until both DMBA and PTMEG 2000 become transparent.

(c) 16.0 -17.0 g (0.095 -0.101 mol) of hexamethylene diisocyanate (HDI and 33.0 -35.0 g (0.148 -0.157 mol) of isophorone diisocynate (IPDI) are added in step 2 together and are reacted to form isocyanate terminated polyurethane at 90° C. and 50 -100 rpm for a polymerization reaction for 5 -10 minutes until a —NCO terminated first prepolymer is formed.

(d) the temperature is decreased to 65° C. and then 11.0 -12.0 g (0.109 -0.119 mol) of triethylamine (TEA) is added for neutralization and catalysis until a —NCO terminated second prepolymer is formed.

(e) the di-n-butylamine back titration method is used to measure the equivalent of the —NCO terminated prepolymer until the equivalent of the prepolymer is controlled at 4,500 g/eq. mol±5% (free —NCO %=0.93±5%). Then, 17.0 -18.0 g (0.076 -0.081 mol) of the remaining IPDI at step (c) is added and mixed at 50 rpm for 10 -15 minutes until a —NCO terminated third prepolymer is formed.

(f) 2.5 -3.0 g (0.022 -0.026 mol) of the coupling agent HEA added at 70° C. and 50 rpm is reacted for 2 -4 hours until —NCO terminated and containing a —C=C— functional fourth prepolymer is formed.

(g) 470-490 g of the deionized water is added to decrease temperature to 40° C., and the rotational speed is increased to 200-300 rpm to be in a PU prepolymer dispersion stage for one hour.

(h) the prepolymer dispersion is conveyed to an emulsifier machine, and 2.5-3.0 g (0.042-0.050 mol) of EDA chain extension agent is added. The emulsifier machine is rotated at 2,000 rpm for a chain extension for 1-2 hours until the solid content of 40.0 wt % of the solvent free PUD seed emulsion is produced.

2. Preparation of Initiator Solution and Pre-emulsion Acrylate:

(i) 0.50-0.80 g (0.33 wt %-0.53 wt % of acrylate monomers) of KPS is dissolved in 60-75 g of the deionized water to obtain an initiator solution which is equally distributed into three parts.

(j) 0.30-0.40 g (0.20 wt %-0.27 wt % of the acrylate monomers) of SDS and 0.30-0.40 g (0.20 wt %-0.27 wt % of the acrylate monomers) of LRS 10, and 5.0-8.0 g (3.33 wt %-5.33 wt % of the acrylate monomers) of the soft monomer n-BA are emulsified in 15-30 g of the deionized water to obtain a first pre-emulsion acrylate.

(k) 0.30-0.40 g (0.20 wt %-0.27 wt % of the acrylate monomers) of emulsifier SDS, 0.30-0.40 g (0.20 wt %-0.27 wt % of the acrylate monomers) of emulsifier LRS 10, 110-115 g (73.3 wt %-76.7 wt % of the acrylate monomers) of n-BA, and 27-33 g (18.0 wt %-22.0 wt % of the acrylate monomers) of MMA are emulsified in 120-140 g of the deionized water to obtain a second pre-emulsion acrylate.

3. Synthesizing PAU Copolymer:

(l) Synthesized 500 g of PUD seed emulsion is added to a reaction vessel, the temperature is set at 70-90° C., the rotational speed is set at 300-500 rpm, the first pre-emulsion acrylate is added to the reaction vessel at the speed of 0.40-0.70 mL/min, and the first KPS initiator solution is added to the reaction vessel at the speed of 0.30-0.45 mL/min.

(m) After reacting for 1-2 hours, the second pre-emulsion acrylate is added to the reaction vessel at the speed of 1.00-1.20 mL/min, and a second KPS initiator solution is added to the reaction vessel at the speed of 0.10-0.30 mL/min.

(n) After adding half of the amount of the second pre-emulsion acrylate, the remaining third KPS initiator solution is added to the reaction vessel at the speed of 0.10-0.30 mL/min.

(o) After adding, the reaction temperature is increased to 90-95° C. and maintained for 1-2 hours prior to turning off the heating. The reaction vessel is cooled for one hour, and the solid content of 40.0 wt % of the solvent free super soft PAU, called AUH2M2, is produced.

Embodiment 2: Composition ratio of HEA:EDA as PUD chain extension agents is 0:10, and the synthesized PAU copolymer is called AUH0M2.

1. Synthesizing PUD Seed Emulsion:

Steps (a)-(g) are the same as embodiment 1, step (f) is omitted herein, and HEA is not added to the process. Thus, a detailed description thereof is omitted herein for the sake of brevity.

(h) the prepolymer dispersion is conveyed to an emulsifier machine, and 3.0 -3.4 g (0.050-0.057 mol) of the EDA chain extension agent is added. The emulsifier machine is rotated at 2,000 rpm for a chain extension for 1-2 hours until a solid content of 40.0 wt % of the solvent free PUD seed emulsion is produced.

2. Preparation of Initiator Solution and Pre-emulsion Acrylate:

Steps (i) to (k) are the same as embodiment 1 and, thus, are omitted herein for the sake of brevity.

3. Synthesizing PAU Copolymer:

Steps (l) to (o) are the same as embodiment 1 and, thus, are omitted herein for the sake of brevity. The synthesized PAU copolymer is called AUH0M2.

Embodiment 3: Composition ratio of HEA:EDA as PUD chain extension agents is 4:6, and the synthesized PAU product is called AUH4M2.

1. Synthesizing PAD Seed Copolymer:

Steps (a) to (e) are the same as embodiment 1 and, thus, are omitted herein for the sake of brevity.

(f) 5.0-6.0 g (0.043-0.052 mol) of HEA is added. Reaction is taken at 70° C., and the rotational speed is 50 rpm. The reaction takes 2-4 hours.

(g) 470-490 g of deionized water is added to the reaction vessel. Temperature is decreased to 40° C., and the rotational speed is increased to 200-300 rpm at PU prepolymer dispersion stage for one hour.

(h) the prepolymer dispersion is conveyed to an emulsifier machine, and 2.3-2.5 g (0.038-0.042 mol) of EDA chain extension agent is added. The emulsifier machine is rotated at 2,000 rpm for the chain extension for 1-2 hours until the solid content of 40.0 wt % of the solvent free PUD seed emulsion is produced.

2. Preparation of Initiator Solution and Pre-Acrylate Emulsion:

Steps (i) to (k) are the same as embodiment 1 and, thus, are omitted herein for the sake of brevity.

3. Synthesizing PAU Copolymer:

Steps (l) to (o) are the same as embodiment 1 and, thus, are omitted herein for the sake of brevity. The PAU copolymer is called AUH4M2.

Composition and mechanical properties of the solvent free super soft PAU with different amounts of HEA of embodiments 1 to 3 are tabulated in tables 1 and 2 respectively.

As shown with the mechanical properties of PAU in table 2, and with the addition of the amount of HEA, a chemical bonding degree of HEA and PAD is increased, and the modulus of each extension rate is increased. From the PUD formula, HEA:EDA is 2.0:8.0, the synthesized AUH2M2 has 500% modulus of 4.0 MPa complying with a super soft PAU specification, but the tensile strength is 13.7 MPa, which is less than the required 15.0 MPa.

TABLE 1

(embodiment) prescription table

|  | AUH2M2 | AUH0M2 | AUH4M2 |
|---|---|---|---|
| PUD composition | | | |
| HDI-IPDI (g) | 66-70 | 66-70 | 66-70 |
| polyol (g) | 210-230 | 210-230 | 210-230 |
| carboxylic diol (g) | 15-17 | 15-17 | 15-17 |
| TEA (g) | 11-12 | 10-11 | 11-12 |
| HEA (g) | 2.5-3.0 | 0 | 5.0-6.0 |

TABLE 1-continued (embodiment) prescription table

|  | AUH2M2 | AUH0M2 | AUH4M2 |
|---|---|---|---|
| EDA (g) | 2.5-3.0 | 3.0-3.4 | 2.3-2.5 |
| free NCO (g) | 0.93 ± 5.0% | 0.93 ± 5.0% | 0.93 ± 5.0% |
| D.I. water (g) | 470-490 | 470-490 | 470-490 |
| HEA:EDA (molar ratio) | 2:8 | 0:10 | 4:6 |
| PAU composition | | | |
| PUD (g) | 500 | 500 | 500 |
| KPS (g) | 0.5-0.8 | 0.5-0.8 | 0.5-0.8 |
| SDS (g) | 0.6-0.8 | 0.6-0.8 | 0.6-0.8 |
| LRS 10 (g) | 0.6-0.8 | 0.6-0.8 | 0.6-0.8 |
| MMA (g) | 27.0-35.0 | 27.0-35.0 | 27.0-35.0 |
| n-BA (g) | 110-115 | 110-115 | 110-115 |
| D.I. water (g) | 200-230 | 200-230 | 200-230 |

TABLE 2

(embodiment) mechanical properties of PAU

|  | AUH2M2 | AUH0M2 | AUH4M2 |
|---|---|---|---|
| 100% modulus (MPa) | 1.2 | 0.6 | 2.0 |
| 300% modulus (MPa) | 2.2 | 1.2 | 3.9 |
| 500% modulus (MPa) | 4.0 | 1.9 | 8.2 |
| Tensile strength (MPa) | 13.7 | 9.5 | 20.2 |
| Elongation (%) | 934 | 1,246 | 748 |

Embodiments 4 to 8 discuss the effect of the ratios of the added hard monomer MMA and the soft monomer n-BA in PAU for solvent free super soft PAU core-shell copolymer dispersions in which weight percentage ratios of added MMA and n-BA are 1.0:9.0, 2.0:8.0, 3.0:7.0, 4.0:6.0 and 5.0:5.0 for synthesizing a solvent free super soft PAU, in which the composition ratio of HEA:EDA is 2.0:8.0, and in which the PA:PU is 75:100 (wt %:wt %).

Embodiment 4: added weight percentage ratio of hard monomer MMA and soft monomer n-BA in PUD is 1.0:9.0, and the synthesized PAU is called A75H2M1.

1. Synthesizing PUD Seed Emulsion:

Steps (a) to (h) are the same as embodiment 1 and, thus, are omitted herein for the sake of brevity.

2. Preparation of Initiator Solution and Pre-emulsion Acrylate:

(i) 0.50-0.80 g (0.33 wt %-0.53 wt % of acrylate monomers) of KPS is dissolved in 70-75 g of deionized water to obtain an initiator solution which is equally distributed into three parts.

(j) 0.30-0.40 g (0.20 wt %-0.27 wt % of acrylate monomers) of SDS and 0.30-0.40 g (0.20 wt %-0.27 wt % of acrylate monomers) of LRS10 and 5.0-8.0 g (3.33 wt %-5.33 wt % of acrylate monomers) of n-BA are emulsified in 25-30 g of deionized water to obtain a first pre-emulsion acrylate.

(k) 0.20-0.40 g (0.13 wt %-0.27 wt % of acrylate monomers) of SDS, 0.20-0.40 g (0.13 wt %-0.27 wt % of acrylate monomers) of LRS 10 and 125-130 g (83.3 wt %-86.7 wt % of acrylate monomers) of n-BA, and 12-18 g (8.0 wt %-12.0 wt % of acrylate monomers) of MMA are emulsified in 120-130 g of deionized water to obtain a second pre-emulsion acrylate.

3. Synthesizing PAU Copolymer:

(l) synthesized 500 g of the seed emulsion PUD is added to a reaction vessel, temperature is set at 70-90° C., rotational speed is set at 300-500 rpm, the first pre-emulsion acrylate is added to the reaction vessel at the speed of 0.50-0.65 mL/min, and the first KPS initiator solution is added to the reaction vessel at the speed of 0.35-0.45 mL/min.

(m) After reacting for 1-2 hours, the second pre-emulsion acrylate is added to the reaction vessel at the speed of 1.00-1.50 mL/min, and a second KPS initiator solution is added to the reaction vessel at the speed of 0.20-0.25 mL/min.

(n) after adding half of the amount of the second pre-emulsion acrylate, the remaining third KPS initiator solution is added to the reaction vessel at the speed of 0.20-0.25 mL/min.

(o) after the adding, the reaction temperature is increased to 90-95° C. and maintained for 1-2 hours prior to turning off the heating. The reaction vessel is cooled for one hour, and the solid content of 40.0 wt % of the solvent free super soft PAU, called A75H2M1, is produced.

Embodiment 5: added weight percentage ratio of hard monomer MMA and soft monomer n-BA in PUD is 2.0:8.0, and the synthesized PAU copolymer is called A75H2M2.

1. Synthesizing PUD Seed Emulsion:

Steps (a) to (h) are the same as embodiment 1 and, thus, are omitted herein for the sake of brevity.

2. Preparation of Initiator Solution and Pre-emulsion Acrylate:

Steps (i) to (j) are the same as embodiment 4 and, thus, are omitted herein for the sake of brevity.

(k) 0.30-0.40 g (0.20 wt %-0.27 wt % of acrylate monomers) of SDS, 0.30-0.40 g (0.20 wt %-0.27 wt % of acrylate monomers) of LRS 10, 110-115 g (73.3 wt % -76.7 wt % of acrylate monomers) of n-BA, and 27-33 g (18.0 wt %-22.0 wt % of acrylate monomer) of MMA are emulsified in 120-130 g of deionized water to obtain a second pre-emulsion acrylate.

3. Synthesizing PAU Copolymer:

Steps (l) to (o) are the same as embodiment 4 and, thus, are omitted herein for the sake of brevity. The synthesized PAU copolymer is called A75H2M2.

Embodiment 6: added weight percentage ratio of hard monomer MMA and soft monomer n-BA in PUD is 3.0:7.0, and the synthesized PAU is called A75H2M3.

1. Synthesizing PUD Seed Emulsion:

Steps (a) to (h) are the same as embodiment 1 and, thus, are omitted herein for the sake of brevity.

2. Preparation of Initiator Solution and Pre-acrylate Emulsion:

Steps (i) to (j) are the same as embodiment 4 and, thus, are omitted herein for the sake of brevity.

(k) 0.20-0.40 g (0.13 wt %-0.27 wt % of acrylate monomers) of SDS, 0.20-0.40 g (0.13 wt %-0.27 wt % of acrylate monomers) of LRS 10, 95-99 g (63.3 wt %-66.0 wt % of acrylate monomers) of n-BA, and 43-48 g (28.7 wt %-32.0 wt % of acrylate monomers) of MMA are emulsified in 120-130 g of deionized water to obtain a second pre-emulsion acrylate.

3. Synthesizing PAU Copolymer:

Steps (l) to (o) are the same as embodiment 4 and, thus, are omitted herein for the sake of brevity. The synthesized PAU is called A75H2M3.

Embodiment 7: added weight percentage ratio of hard monomer MMA and soft monomer n-BA in PUD is 4.0:6.0, and the synthesized PAU copolymer is called A75H2M4.

1. Synthesizing PUD Seed Emulsion:

Steps (a) to (h) are the same as embodiment 1 and, thus, are omitted herein for the sake of brevity.

2. Preparation of Initiator Solution and Pre-acrylate Emulsion:

Steps (i) to (j) are the same as embodiment 4 and, thus, are omitted herein for the sake of brevity.

(k) 0.20-0.40 g (0.13 wt %-0.27 wt % of acrylate monomers) of SDS, 0.20-0.40 g (0.13 wt %-0.27 wt % of acrylate monomers) of LRS 10, 80-84 g (53.3 wt %-56.0 wt % of acrylate monomers) of n-BA, and 58-63 g (38.7 wt %-42.0 wt % of acrylate monomers) of MMA are emulsified in 120-130 g of deionized water to obtain a second pre-emulsion acrylate.

3. Synthesizing PAU Copolymer:

Steps (l) to (o) are the same as embodiment 4 and, thus, are omitted herein for the sake of brevity. The synthesized PAU copolymer is called A75H2M4.

Embodiment 8: added weight percentage ratio of hard monomer MMA and soft monomer n-BA in PUD is 5.0:5.0, and the synthesized PAU copolymer is called A75H2M5.

1. Synthesizing PUD Seed Emulsion:

Steps (a) to (h) are the same as embodiment 1 and, thus, are omitted herein for the sake of brevity.

2. Preparation of Initiator Solution and Pre-acrylate Emulsion:

(i) to (j) are the same as embodiment 4 and, thus, are omitted herein for the sake of brevity.

(k) 0.20-0.40 g (0.13 wt %-0.27 wt % of acrylate monomers) of SDS, 0.20-0.40 g (0.13 wt %-0.27 wt % of acrylate monomers) of LRS 10, 65-70 g (43.3 wt %-46.7 wt % of acrylate monomers) of n-BA, and 72-78 g (48.0 wt %-52.0 wt % of acrylate monomers) of MMA are emulsified in 120-130 g of deionized water to obtain a second pre-acrylate emulsion.

3. Synthesizing PAU Copolymer:

Steps (l) to (o) are the same as embodiment 4 and, thus, are omitted herein for the sake of brevity. The synthesized PAU copolymer is called A75H2M5.

In embodiments 4 to 8, different added weight percentage ratios of MMA and n-BA in PUD are used to prepare solvent free super soft PAU. Composition and mechanical properties of the PAU products are tabulated in tables 3 and 4 respectively.

As shown in the mechanical properties of PAU of table 4, with the addition of the amount of MMA, 100% modulus is increased. A75H2M1is synthesized by added weight percentage ratio of MMA and n-BA being 1.0:9.0; A75H2M2is synthesized by added weight percentage ratio of MMA and n-BA being 2.0:8.0; A75H2M3is synthesized by added weight percentage ratio of MMA and n-BA being 3.0:7.0; and A75H2M4is synthesized by added weight percentage ratio of MMA and n-BA being 4.0:6.0. 500% modulus of each of 3.4 MPa, 4.0 MPa, 4.3 MPa and 3.4 MPa is complied with a super soft PAU specification. The tensile strength of A75UH2M2is 13.7 MPa is increased to that of A75H2M4being 15.6 MPa and is complied with the specifications of the super soft PAU. When A75H2M5is synthesized by the added weight percentage ratio of MMA and n-BA being 5.0:5.0, 500% modulus is 6.7 MPa which does not comply with the specifications of the super soft PAU.

TABLE 3

| (embodiment) prescription | | | | | |
|---|---|---|---|---|---|
| | A75H2M1 | A75H2M2 | A75H2M3 | A75H2M4 | A75H2M5 |
| PUD composition | | | | | |
| HDI-IPDI (g) | 66-70 | 66-70 | 66-70 | 66-70 | 66-70 |
| polyol (g) | 210-230 | 210-230 | 210-230 | 210-230 | 210-230 |
| carboxylic diol (g) | 15-17 | 15-17 | 15-17 | 15-17 | 15-17 |
| TEA (g) | 11-12 | 11-12 | 11-12 | 11-12 | 11-12 |
| HEA (g) | 2.5-3.0 | 2.5-3.0 | 2.5-3.0 | 2.5-3.0 | 2.5-3.0 |
| EDA (g) | 2.5-3.0 | 2.5-3.0 | 2.5-3.0 | 2.5-3.0 | 2.5-3.0 |
| free NCO (g) | 0.93 ± 5.0% | 0.93 ± 5.0% | 0.93 ± 5.0% | 0.93 ± 5.0% | 0.93 ± 5.0% |
| D.I. water (g) | 470-490 | 470-490 | 470-490 | 470-490 | 470-490 |
| PAU composition | | | | | |
| PUD (g) | 500 | 500 | 500 | 500 | 500 |
| KPS (g) | 0.50-0.80 | 0.50-0.80 | 0.50-0.80 | 0.50-0.80 | 0.50-0.80 |
| SDS (g) | 0.40-0.80 | 0.40-0.80 | 0.40-0.80 | 0.40-0.80 | 0.40-0.80 |
| LRS 10 (g) | 0.40-0.80 | 0.40-0.80 | 0.40-0.80 | 0.40-0.80 | 0.40-0.80 |
| MMA (g) | 12-18 | 27-33 | 43-48 | 58-63 | 72-78 |
| n-BA (g) | 132-138 | 117-123 | 102-107 | 87-92 | 72-78 |
| D.I. water (g) | 205-235 | 205-235 | 205-235 | 205-235 | 205-235 |
| MMA:n-BA (wt. %:wt. %) | 1.0:9.0 | 2.0:8.0 | 3.0:7.0 | 4.0:6.0 | 5.0:5.0 |

TABLE 4

| (embodiment) Mechanical properties | | | | | |
|---|---|---|---|---|---|
| | A75H2M1 | A75H2M2 | A75H2M3 | A75H2M4 | A75H2M5 |
| 100% modulus (MPa) | 1.0 | 1.2 | 1.3 | 1.3 | 1.4 |
| 300% modulus (MPa) | 1.8 | 2.2 | 2.3 | 2.1 | 2.7 |
| 500% modulus (MPa) | 3.4 | 4.0 | 4.3 | 3.4 | 6.7 |
| Tensile strength (MPa) | 10.8 | 13.7 | 14.7 | 15.6 | 18.0 |
| Elongation (%) | 757 | 934 | 779 | 897 | 731 |

Embodiments 9 to 12 discuss the effect of the weight ratios of PAD and PUD in PAU products of solvent free super soft PAU core-shell copolymer dispersions in which the added weight percentage ratios of PAD and PUD in the PAU products are 25:100, 50:100, 75:100 and 100:100. The composition ratio of HEA:EDA is 2.0:.8.0, and the ratio of MMA and n-BA is 4.0:6.0.

Embodiment 9: The added weight percentage ratio of PAD and PUD is 25 wt %:100 wt %, and the synthesized PAU copolymer is called A25H2M4.

1. Synthesizing PUD Seed Emulsion:
Steps (a) to (h) are the same as embodiment 1 and, thus, are omitted herein for the sake of brevity.

2. Preparation of Initiator Solution and Pre-emulsion Acrylate:

(i) 0.10-0.30 g (0.20 wt %-0.60 wt % of acrylate monomers) of KPS is dissolved in 24-27 g of deionized water to obtain an initiator solution which is equally distributed into three parts.

(j) 0.10-0.13 g (0.20 wt %-0.26 wt % of acrylate monomers) of SDS, 0.10-0.13 g (having 0.20 wt %-0.26 wt % of acrylate monomers) of LRS10, and 2.0-4.0 g (4.00 wt %-8.00 wt % of acrylate monomers) of n-BA are emulsified in 5-10 g of deionized water to obtain a first pre-acrylate emulsion.

(k) 0.10-0.13 g (0.20 wt %-0.26 wt % of acrylate monomers) of SDS, 0.10-0.13 g (0.20 wt %-0.26 wt % of acrylate monomers) of LRS 10, 25-30 g (50.0 wt %-60.0 wt % of acrylate monomers) of n-BA, and 16-23 g (32.0 wt %-46.0 wt % of acrylate monomers) of MMA are emulsified in 35-45 g of deionized water to obtain a second pre-emulsion acrylate.

3. Synthesizing PAU Copolymer:

(l) The synthesized 500 g of the seed emulsion PUD is poured into a reaction vessel, temperature is set at 70-90° C., a rotational speed 300-500 rpm is set, a first pre-emulsion acrylate is added to the reaction vessel at the speed of 0.20-0.25 mL/min, and the first KPS initiator solution is added to the reaction vessel at the speed of 0.10 mL-0.20 mL/min.

(m) After reacting for 1-2 hours, the second pre-emulsion acrylate is added to the reaction vessel at the speed of 0.25-0.30 mL/min, and a second KPS initiator is added to the reaction vessel at the speed of 0.05-0.10 mL/min.

(n) After adding a half amount of the second pre-emulsion acrylate, the remaining third KPS initiator solution is added to the reaction vessel at the speed of 0.05-0.10 mL/min.

(o) After the adding, the reaction temperature is increased to 90-95° C. and maintained for 1-2 hours prior to turning off the heating. The reaction vessel is cooled for one hour, and the solid content of 40.0 wt % of the solvent free super soft PAU, called A25H2M4, is produced.

Embodiment 10: added weight percentage ratio of PAD and PUD in PAU is 50 wt %:100 wt %, and the synthesized PAU copolymer is called A50H2M4.

1. Synthesizing PUD Seed Emulsion:
Steps (a) to (h) are the same as embodiment 1 and, thus, are omitted herein for the sake of brevity.

2. Preparation of Initiator Solution and Pre-emulsion Acrylate:

(i) 0.30-0.51 g (0.30 wt %-0.51 wt % of acrylate monomers) of KPS is dissolved in 48-60 g of deionized water to obtain an initiator solution which is equally distributed into three parts.

(j) 0.20-0.30 g (0.20 wt %-0.30 wt % of acrylate monomers) of SDS, 0.20-0.30 g (0.20 wt %-0.30 wt % of acrylate monomers) of LRS10, and 3.0-6.0 g (3.0 wt %-6.0 wt % of acrylate monomers) of n-BA are emulsified in 10-20 g of deionized water to obtain a first pre-emulsion acrylate.

(k) 0.20-0.30 g (0.20 wt %-0.30 wt % of acrylate monomers) of SDS, 0.20-0.30 g (0.20 wt %-0.30 wt % of acrylate monomers) of LRS 10, 52-57 g (52.0 wt %-57.0 wt % of acrylate monomers) of n-BA, and 37-45 g (37.0 wt %-45.0 wt % of acrylate monomers) of MMA are emulsified in 85-95 g of deionized water to obtain a second pre-emulsion acrylate.

3. Synthesizing PAU Copolymer:

Steps (l) to (o) are the same as embodiment 9 and, thus, are omitted herein for the sake of brevity. The synthesized PAU copolymer is called A50H2M4.

Embodiment 11: added weight percentage ratio of PAD and PUD in PAU is 75 wt %:100 wt %, and the synthesized PAU copolymer is called A75H2M4.

1. Synthesizing PUD Seed Emulsion:

Steps (a) to (h) are the same as embodiment 1 and, thus, are omitted herein for the sake of brevity.

2. Preparation of Initiator Solution and Pre-emulsion Acrylate:

(i) 0.50-0.80 g (0.33 wt %-0.53 wt % of acrylate monomers) of KPS is dissolved in 60-75 g of deionized water to obtain an initiator solution which is equally distributed into three parts.

(j) 0.20-0.40 g (0.13 wt %-0.27 wt % of acrylate monomers) of SDS, 0.30-0.40 g (0.20 wt %-0.27 wt % of acrylate monomers) of LRS10, and 5.0-8.0 g 3.3 wt %-5.3 wt % of acrylate monomers) of n-BA are emulsified in 15-30 g of deionized water to obtain a first pre-acrylate emulsion.

(k) 0.20-0.40 g (0.13 wt %-0.27 wt % of acrylate monomers) of SDS, 0.20-0.40 g (0.13 wt %-0.27 wt % of acrylate monomers) of LRS 10, 80-85 g (53.3 wt %-56.7 wt % of acrylate monomers) of n-BA, and 57.0-63.0 g (38.0 wt %-42.0 wt % of acrylate monomers) of MMA are emulsified in 120-130 g of deionized water to obtain a second pre-emulsion acrylate.

3. Synthesizing PAU Copolymer:

Steps (l) to (o) are the same as embodiment 9 and, thus, are omitted herein for the sake of brevity. The synthesized PAU copolymer is called A75H2M4.

Embodiment 12: added weight percentage ratio of PAD and PUD in PAU is 100 wt %:100 wt %, and the synthesized PAU copolymer is called A100H2M4.

1. Synthesizing PUD Seed Emulsion:

Steps (a) to (h) are the same as embodiment 1 and, thus, are omitted herein for the sake of brevity.

2. Preparation of Initiator Solution and Pre-emulsion Acrylate:

(i) 0.90-1.20 g (0.45 wt %-0.60 wt % of acrylate monomers) of KPS is dissolved in 90-100 g of deionized water to obtain an initiator solution which is equally distributed three parts.

(j) 0.40-0.60 g (0.20 wt %-0.30 wt % of acrylate monomers) of SDS, 0.40-0.6 g (0.20 wt %-0.30 wt % of acrylate monomers) of LRS10, and 8.0-12.0 g (4.0 wt %-6.0 wt % of acrylate monomers) of n-BA are emulsified in 30-40 g of deionized water to obtain a first pre-emulsion acrylate.

(k) 0.40-0.60 g (0.20 wt %-0.30 wt % of acrylate monomers) of SDS, 0.40-0.60 g (0.20 wt %-0.30 wt % of acrylate monomers) of LRS 10, 148-152 g (74.0 wt %-76.0 wt % of acrylate monomers) of n-BA, and 38-44 g (19.0 wt %-22.0 wt % of acrylate monomers) of MMA are emulsified in 160-190 g of deionized water to obtain a second pre-emulsion acrylate.

3. Synthesizing PAU Copolymer:

Steps (l) to (o) are the same as embodiment 9 and, thus, are omitted herein for the sake of brevity. The synthesized PAU copolymer is called A100H2M4.

In embodiments 9 to 12, different weight ratios of PAD and PUD are used to prepare the solvent free super soft PAU. The composition and mechanical properties of the PAU products are tabulated in tables 5 and 6 respectively.

As shown with the mechanical properties of PAU in table 6, with increasing the amount of PAD, the tensile strength is decreased due to plasticization of n-BA. As obtained by experiments, 500% modulus is less than 6.0 MPa, and the tensile strength is greater than 15.0 MPa for solvent free super soft PAU products such as A50H2M4, A75H2M4 and A100H2M4 synthesized by added weight percentage ratios of PAD and PUD being 50 wt %:100 wt %, 75 wt %:100 wt % and 100 wt %:100 wt % respectively. The solvent free super soft PAU products display smoothness.

TABLE 5

(embodiment) PUD prescription table

|  | A25H2M4 | A50H2M4 | A75H2M4 | A100H2M4 |
|---|---|---|---|---|
| PUD composition | | | | |
| HDI-IPDI (g) | 66-70 | 66-70 | 66-70 | 66-70 |
| polyol (g) | 210-230 | 210-230 | 210-230 | 210-230 |
| carboxylic diol (g) | 15-17 | 15-17 | 15-17 | 15-17 |
| TEA (g) | 11-12 | 11-12 | 11-12 | 11-12 |
| HEA (g) | 2.5-3.0 | 2.5-3.0 | 2.5-3.0 | 2.5-3.0 |
| EDA (g) | 2.3-2.5 | 2.3-2.5 | 2.3-2.5 | 2.3-2.5 |
| free NCO (g) | 0.93 ± 5.0% | 0.93 ± 5.0% | 0.93 ± 5.0% | 0.93 ± 5.0% |
| D.I. water (g) | 470-490 | 470-490 | 470-490 | 470-490 |
| PAU composition | | | | |
| PUD (g) | 500 | 500 | 500 | 500 |
| KPS (g) | 0.10-0.30 | 0.30-0.51 | 0.60-0.80 | 0.90-1.20 |
| SDS | 0.20-0.26 | 0.40-0.60 | 0.40-0.80 | 0.80-1.20 |
| LRS 10 | 0.20-0.26 | 0.40-0.60 | 0.40-0.80 | 0.80-1.20 |
| MMA | 16.0-23.0 | 37.0-45.0 | 57.0-63.0 | 38.0-44.0 |
| n-BA | 25-30 | 52-57 | 80-85 | 148-152 |
| D.I. water (g) | 60-90 | 145-170 | 205-235 | 300-340 |
| PAD:PUD (wt. %:wt. %) | 25:100 | 50:100 | 75:100 | 100:100 |

TABLE 6

(embodiment) mechanical properties

|  | A25H2M4 | A50H2M4 | A75H2M4 | A100H2M4 |
|---|---|---|---|---|
| 100% modulus (MPa) | 1.7 | 1.2 | 1.3 | 1.3 |
| 300% modulus (MPa) | 3.2 | 2.0 | 2.1 | 2.4 |
| 500% modulus (MPa) | 7.7 | 3.8 | 3.4 | 5.4 |
| Tensile strength (MPa) | 31.0 | 21.4 | 15.6 | 15.1 |
| Elongation (%) | 871 | 1,267 | 897 | 712 |

In embodiments 1 to 12, they discuss products such as A50H2M4, A75H2M4 and A100H2M4 of solvent free super soft PAU core-shell copolymer dispersions for the composition ratio of HEA:EDA being 2.0:8.0, with the weight percentage ratio of MMA and n-BA being 4.0:6.0, and with the weight ratios of PAD:PUD being 50:100, 75:100 and 100:100. These PAU products are smooth. Further, PAU has good adhesion with nylon and polyester.

A mole ratio of the polyol to the DMBA is 0.57 to 9.11, and a molar percentage of the polyol to DMBA is 36.3%: 63.7% to 90.1%:9.9%; a mole ratio of the diisocyanate having isocyanate functional group to the first mixture is 1.08 to 1.12, and a molar percentage of the diisocyanate having the isocyanate functional group to the first mixture is 51.9%:48.1% to 52.9%:47.1%; a mole ratio of the —NCO terminated first prepolymer to the neutralizing agent is 0.38 to 1.56, and a molar percentage of the —NCO terminated first prepolymer to the neutralizing agent is 27.7%:72.3% to 61.0%:39.0%; a mole ratio of the —NCO terminated second prepolymer to the remaining diisocyanate having isocyanate functional group is 0.14 to 0.63, and a molar percentage of the —NCO terminated second prepolymer to the remaining diisocyanate having isocyanate functional group is 12.2%: 87.8% to 38.6%:61.4%; and a mole ratio of the —NCO terminated third prepolymer to the HEA is 0 to 2, and a molar percentage of the —NCO terminated third prepolymer to the HEA is 66.7%:33.3% to 100.0%:0%.

Preferably, a hydrophilic percentage is defined as the weight of hydrophilic molecules divided by the weight of polyurethane (PU) molecules times 100%; a weight percentage (w/w) of hydrophilic molecules is 2.0 to 7.0%, and the weight percentage is 2.0 wt %:98.0 wt % to 6.5 wt %:93.5 wt %. The weight of hydrophilic molecules is the weight of DMBA molecules; and the weight of PU molecules is defined as a summation of weights of molecules of diisocyanates, polyol, DMBA, the neutralizing agent, the coupling agent, and the chain extension agent.

Preferably, a molar mass of the polyol is 500 to 2,000 g/mol, and the polyol is implemented as a polycarbonate diols (PCD) having a functional group of carbonate, a polyether diols having a functional group of ether, a polyester diols having a functional group of ester, or a combination of any of polycarbonate diols (PCD) having a functional group of carbonate, a polyether diols having a functional group of ether, and a polyester diols having a functional group of ester.

Preferably, diisocyanates is implemented as m-tetramethylxylene diisocynate, m-TMXDI, isophorone diisocyanate (IPDI), 4,4'-Methylene dicyclohexyl diisocyanate ($H_{12}$MDI), hexamethylene diisocyanate (HDI), 1,4-cyclohexane diisocyanate (CHDI), xylene diisocyanate (XDI), hydrogenated xylylene diisocyanate ($H_6$XDI), 2,2,4/2,4,4-trimethyl-1, 6-diisocyanatohexane, 50%/50%, 2,2,4/2,4,4-trimethyl-1, 6-diisocyanatohexane; 50%/50% (TMHDI), 5/2,6-bis (isocyanatomethyl) bicycle[2.2.1] heptane, isocyanatomethyl bicycle[2.2.1] heptane, (NBDI), methyl cyclohexamethylene diisocyanate (HTDI), L-lysine diisocyanate, (LDI), 1,8-octamethylene diisocyanate, 1,10-decamethylene diisocyanate, 1,12-dodecamethylene diisocyanate, 2-methylpentane-1,5-diyl diisocyanate (MPDI), or a combination of any of m-TMXDI, IPDI, H12MDI, HDI, CHDI, XDI, H6XDI, 2,2,4/2,4,4-trimethyl-1,6-diisocyanatohexane, 50%/50%, TMHDI, 2,6-bis (isocyanatomethyl) bicycle [2.2.1] heptane, NBDI, HTDI, LDI, 1,8-octamethylene diisocyanate, 1,10-decamethylene diisocyanate, 1,12-dodecamethylene diisocyanate, and MPDI.

Preferably, the amines neutralizing agent is implemented as triethylamine (TEA), tripropylamine (TPA), lithium hydroxide (LiOH), sodium hydroxide (NaOH), potassium hydroxide (KOH), or a combination of any of TEA, TPA, LiOH, NaOH, and KOH.

Preferably, a molar mass of the chain extension agent is less than 400 g/mol, and the chain extension agent are implemented as diamines or diols. The diamines is implemented as ethylene diamine (EDA), butane diamine (BDA), pentane diamine (PDA), hexamethylene diamine (HDA), hydrazine (HH), carbonic dihydrazide (CDH), adipic dihydrazide (ADH); and the diols are implemented as ethylene glycol (EG), propylene glycol (PG), butylene glycol(BG), pentylene glycol, hexylene glycol(HG), or a combination of any of EG, PG, BG, pentylene glycol, and HG.

In the above steps of preparing the initiator solution and pre-emulsion acrylate, the initiator solution is peroxymonosulfuric acid, potassium persulfate, KPS, sodium persulfate, ammonium persulfate, hydrogen peroxide, organic peroxide, diacyl peroxide, peroxy acid, perester or azo compounds.

In the above steps of preparing the initiator solution and pre-emulsion acrylate, the emulsifier is polyoxyethylene alkyl ether ammonium sulfate, sodium dodecyl sulfate, SDS, sodium dodecyl benzene sulfonate, dioctyl sodium sulfosuccinate, sodium dodecyl diphenyl disalfonate, succinate polyoxyethylene alkyl phenol ether sulfonate half ester, hexadecyltrimethylammonium bromide, poly ehthylene oxide-b-propylene oxide or polyoxyethylene alxylphenol ether.

In the above steps of preparing the initiator solution and pre-emulsion acrylate, the acrylate involves using methyl acrylate, ethyl acrylate, n-butyl acrylate, 2-ethylhexyl acrylate, lauryl acrylate, methyl methacrylate, ethyl methacrylate, n-butyl methacrylate, isobutyl methacrylate, 2-ethylhexyl methacrylate, dodecyl 2-methylacylate, acrylic acid, methacrylic acid, 2-(dimethylamino)ethyl methacrylate, 2-hydroxyethyl acrylate, 2-hydroxypropyl acrylate, 2-hydroxyethyl methacrylate, 2-hydroxypropyl methacrylate, acrylamide, glycidyl acrylate, or glycidyl methacrylate.

The above polyurethane is a polymer containing a urethane group on the molecular bond and includes a polymer having both an urethane group and an urea group.

The polyacrylate of the invention is defined as a copolymer of acrylic acid, and acrylic acid and ester.

The dispersion solution of the invention is defined as a dispersed emulsion having water as a solvent.

In the method of producing the polyurethane dispersion (PUD) and polyacrylate-urethane (PAU) dispersions by a solvent free process of the invention, no organic solvent is added thereto.

The core-shell of the invention is defined as PAU products having a shell structure of PUD and a core structure of PAD as observed by transmission electron microscope (TEM).

The super soft PAU core-shell copolymers of the invention are defined as having a 500% modulus less than 6.0 MPa, and the tensile strength greater than 15.0 MPa. The hand touching a fabric having the super soft characteristic of the invention feels like touching a peach.

A soft monomer of the invention is called an adhesive monomer. It is defined as the major monomer for preparing a poly acrylate emulsion. Its main function is to provide adhesiveness and to increase elasticity and softness of a plastic layer. A hard monomer of the invention is called a cohesive monomer. It is defined as one for providing increased cohesive strength and higher operating temperatures for the poly acrylate emulsion. It also can improve water resistance, adhesive strength and transparency of a plastic layer.

While the invention has been described in terms of preferred embodiments, those skilled in the art will recognize that the invention can be practiced with modifications within the spirit and scope of the appended claims.

What is claimed is:

1. A method of producing dispersions from acrylate monomers by a solvent free process comprising:
    (a) synthesizing a solvent free polyurethane dispersion (PUD) in the amount of 40.0 wt % of the acrylate monomers as a seed emulsion;
    (b) taking an initiator in the amount of 0.20 wt. %-0.60 wt. % of the acrylate monomers to dissolve in deionized water to obtain an initiator solution which is equally distributed into first, second and third parts;
(c) taking an emulsifier in the amount of 0.20 wt %-0.30 wt % of the acrylate monomers, polyoxyethylene alkyl ether ammonium sulfate in the amount of 0.20-0.30 wt. % of the acrylate monomer, and n-butyl acrylate (n-BA) as a soft monomer in the amount of 3.0-8.0 wt. % of the acrylate monomers to emulsify in the deionized water to obtain a first pre-emulsion acrylate;
(d) taking the emulsifier in the amount of 0.20 wt %-0.30 wt % of the acrylate monomers, the polyoxyethylene alkyl ether ammonium sulfate in the amount of 0.13 wt %-0.30 wt % of the acrylate monomers, the n-BA in the amount of 43.3 wt %-86.7 wt % of the acrylate monomers, and methyl methacrylate (MMA) as a hard monomer in the amount of 8.0 wt %-52.0 wt % of the acrylate monomers to emulsify in the deionized water to obtain a second pre-emulsion acrylate;
(e) pouring the solvent free PUD into a reaction vessel having a reaction temperature set at 70-90° C. and a rotational speed set at 300-500 rpm for reaction;
(f) adding the first pre-emulsion acrylate and the first part of the initiator solution to the reaction vessel for one to two hours;
(g) adding the second pre-emulsion acrylate and the second part of the initiator solution into the reaction vessel;
(h) after adding more than half of the second pre-emulsion acrylate, adding the third part of the initiator solution into the reaction vessel;
(i) increasing the reaction temperature up to 90-95° C.;
(j) maintaining the reaction temperature for one to two hours and turning off heating; and
(k) cooling the reaction vessel for one hour to produce a solid content of 40.0 wt % of solvent free super soft polyacrylate-urethane (PAU) core-shell copolymer dispersions, wherein a weight percentage ratio of polyacrylate (PA) and polyurethane (PU) is 25 wt %:100 wt % -100 wt %:100 wt %.

2. The method of claim 1, wherein synthesizing the seed emulsion comprises:
(1) drying polyol at a temperature in vacuum for a period of time;
(2) placing both the dried polyol and 2,2-dimethylol butanoic acid (DMBA) in another reaction vessel to mix at 90° C. and rotate at a rotational speed 100 rpm until a mixture becomes transparent;
(3) adding diisocyanate having an isocyanate functional group (—NCO) to the mixture to react at 70-90° C. and a rotational speed of 50-100 rpm for 5-10 minutes until a —NCO terminated first prepolymer is formed;
(4) decreasing temperature of the —NCO terminated first prepolymer to 65° C.;
(5) adding a neutralizing agent to the —NCO terminated first prepolymer for neutralization and catalysis until a —NCO terminated second prepolymer is formed;
(6) adding the remaining diisocyanate having the isocyanate functional group to the —NCO terminated second prepolymer to form a —NCO terminated third prepolymer;
(7) adding deionized water to the third prepolymer to form a prepolymer dispersion; and
(8) adding a chain extension agent to the prepolymer dispersion to rotate at a range of 1,000 to 2,000 rpm for a chain extension for 1-3 hours until the solvent free PUD is produced;

wherein a mole ratio of the polyol to the DMBA is 0.57 to 9.11, and a molar percentage of the polyol to DMBA is 36.3%:63.7% to 90.1%:9.9%;
wherein a mole ratio of the diisocyanate having the isocyanate functional group to the mixture of the —NCO terminated first prepolymer is 1.08 to 1.12 and a molar percentage of the diisocyanate having the isocyanate functional group to the mixture of the —NCO terminated first prepolymer is 51.9%:48.1% to 52.9%:47.1%;
wherein a mole ratio of the —NCO terminated first prepolymer to the neutralizing agent is 0.38 to 1.56, and a molar percentage of the —NCO terminated first prepolymer to the neutralizing agent is 27.7%:72.3% to 61.0%:39.0%; and
wherein a mole ratio of the —NCO terminated second prepolymer to the diisocyanate having the isocyanate functional group is 0.14 to 0.63, and a molar percentage of the —NCO terminated second prepolymer to the diisocyanate having the isocyanate functional group is 12.2%:87.8% to 38.6%:61.4%.

3. The method of claim 2, further comprising adding hydroxyethyl acrylate (HEA) to the —NCO terminated third prepolymer and agitating for two to four hours to form a —NCO terminated fourth prepolymer having a —C=C- functional group; and wherein a mole ratio of the —NCO terminated third prepolymer to the HEA is 0 to 2.0, and a molar percentage of the —NCO terminated third prepolymer to the HEA is 66.7% :33.3% to 100.0%:0%.

4. The method of claim 1, wherein: adding the first pre-emulsion acrylate to the reaction vessel is at the speed of 0.40-0.70 mL/min, and adding of the KPS initiator solution to the reaction vessel is at a speed of 0.30-0.45 mL/min; adding the second pre-acrylate emulsion is at a speed of 1.00-1.20 mL/min and the second part of the initiator solution is at the speed of 0.10-0.30 mL/min; and adding the third part of the initiator solution is at a speed of 0.10-0.30 mL/min.

5. The method of claim 1, wherein the acrylate monomers are methyl acrylate, ethyl acrylate, n-butyl acrylate, 2-ethylhexyl acrylate, lauryl acrylate, methyl methacrylate, ethyl methacrylate, n-butyl methacrylate, isobutyl methacrylate, 2-ethylhexyl methacrylate, dodecyl 2-methylacylate, acrylic acid, methacrylic acid, 2-(dimethylamino)ethyl methacrylate, 2-hydroxyethyl acrylate, 2-hydroxypropyl acrylate, 2-hydroxyethyl methacrylate, 2-hydroxypropyl methacrylate, acrylamide, glycidyl acrylate or glycidyl methacrylate.

6. The method of claim 1, wherein the initiator solution is potassium persulfate, sodium persulfate, ammonium persulfate, hydrogen peroxide, organic peroxide, diacyl peroxide, peroxy acid, perester or azo compounds.

7. The method of claim 1, wherein the emulsifier is sodium dodecyl benzene sulfonate, dioctyl sodium sulfosuccinate, sodium dodecyl diphenyl disalfonate, succinate polyoxyethylene alkyl phenol ether sulfonate half ester, succinate polyoxyethylene alkyl phenol ether sulfonate half ester, poly ehthylene oxide-b-propylene oxide or polyoxyethylene alxylphenol ether.

8. The method of claim 1, wherein the super soft PAU core-shell copolymer dispersions have a shell of PUD and a core of polyacrylate dispersions.

9. The method of claim 8, wherein the super soft PAU core-shell copolymer dispersions have a 500% modulus less than 6.0 MPa, and a tensile strength greater than 15.0 MPa.

* * * * *